(12) United States Patent
Laiti

(10) Patent No.: US 6,796,896 B2
(45) Date of Patent: Sep. 28, 2004

(54) ENVIRONMENTAL CONTROL UNIT, AND AIR HANDLING SYSTEMS AND METHODS USING SAME

(76) Inventor: Peter J. Laiti, 6165 Pohick Station Dr., Fairfax Station, VA (US) 22039

( * ) Notice: Subject to any disclaimer, the term of this patent is extended or adjusted under 35 U.S.C. 154(b) by 0 days.

(21) Appl. No.: 10/400,488

(22) Filed: Mar. 28, 2003

(65) Prior Publication Data

US 2004/0058637 A1 Mar. 25, 2004

(51) Int. Cl.[7] .................................................. F24F 7/06

(52) U.S. Cl. ........................ 454/229; 454/233; 454/236; 454/239

(58) Field of Search ................................ 454/229, 239, 454/228, 230, 233, 234, 236, 241, 249

(56) References Cited

U.S. PATENT DOCUMENTS 5,279,609 A * 1/1994 Meckler ..................... 236/49.3
5,976,010 A * 11/1999 Reese et al. ................ 454/229
6,126,540 A * 10/2000 Janu et al. .................. 454/229

OTHER PUBLICATIONS

Filtration News, vol. 20, No. 4, pp. 22, 24, 26 (Jul./Aug. 2002).

* cited by examiner

Primary Examiner—Jiping Lu
(74) Attorney, Agent, or Firm—Fitch, Even, Tabin & Flannery

(57) ABSTRACT

An environmental control unit, and air handling systems using it, that combines, as a unitary packaged unit, equipment and associated functionality for air handling and affording protection to occupants and/or equipment in an enclosure against airborne release of chemical, biological, or radiological (CBR) agents.

26 Claims, 9 Drawing Sheets

ENVIRONMENTAL CONTROL UNIT, AND AIR HANDLING SYSTEMS AND METHODS USING SAME

TECHNICAL FIELD

The present invention relates generally to an environmental control unit for use in air handling systems that provides air conditioning, heating, and high efficiency airborne toxic agent filtration equipment and functions in a single unitary packaged unit, and, in particular, relates to a unitary packaged unit providing heating, ventilation and/or air conditioning of an air supply provided to an enclosure as well as protecting the occupant(s) and equipment in the enclosure against external or internal airborne release of toxic chemical, biological, or radiological agents that threaten to contaminate the air supply. It also relates to an air handling method and system providing CBR filtering for the airspace of a shelter or safe room.

BACKGROUND OF THE INVENTION

There is an ever-increasing need for air handling systems that include air filtration systems that can be deployed to protect an enclosure against noxious airborne agents released in the vicinity of the enclosure. Every year there are numerous incidents of noxious fumes entering buildings and causing illness and disruptions due to accidents or malicious pranks. There now is heightened concern about super-toxic airborne agents being released as part of a nuclear, biological or chemical ("NBC") attack launched by terrorists in a metropolitan area or as directed against a particular governmental, public or private building or structure. In addition, military personnel in combat areas may need protection from enemy releases of airborne chemical, biological, and radiological ("CBR") agents in the vicinity of a tent or other enclosure area where the troops are bivouacked or have set up a field command or field hospital, and so forth. Whether a civilian or military setting, a typical air handling system for an enclosure will be served by ductwork connecting airflow between the enclosure and a remote HVAC ("heating, ventilating, and air conditioning") unit. The HVAC system is normally used to adjust the temperature of the airflow and circulate the air to and from one or more enclosures.

Standard dust filters are ineffective against CBR agents. Standard dust filters, such as cardboard framed fiberglass matt filters, have relatively low efficiency rates for removing for dust and particles, and are not useful for removing pollen, microorganisms, smoke, or gases. Commercially available electrostatic fiber filters have higher efficiencies than standard dust filters and can remove pollens and other small solid particulates, but they can not intercept and remove gases. HEPA ("High-Efficiency Particulate Air") filters are known that are used for high-efficiency filtration of airborne dispersions of ultrafine solid and liquid particulates such as dust and pollen, radioactive particle contaminants, and aerosols. For example, for removal of non-toxic aerosols, HEPA filters are typically used as the sole filtration element. The efficiency of a HEPA filter is standardized as being at least 99.97% for particles of dioctylphthalate (DOP) having a size of 0.3 microns in diameter. The airflow resistance of conventional HEPA filters is typically about one (1) inch, water gauge (iwg) at 500 feet per minute (FPM) approach velocity. This resistance increases steadily as the HEPA filter loads with dust or other fine particles in service. However, where the threat is a gaseous chemical compound or a gaseous particle of extremely small size (i.e., <0.001 microns), the conventional commercially-available HEPA filters can not intercept and control those types of airborne agents. In addition, the vast majority of prior air handling systems have not been designed nor were designable to accommodate the large increase in airflow resistance that would be associated with use of a conventional HEPA filter.

The most commonly found filter technology used to filter gaseous substances and materials from an airflow is based on activated carbon. CBR filtering has been previously implemented in certain applications, such as in gas masks or in industrial processes, by using filter beds of activated impregnated carbons or other sorbents for ultra-high-efficiency filtration of super toxic chemical vapors and gases from an air or gas stream passed through the filter. Commercial filters of this sort generally include activated carbon loaded nonwovens, in which the activated carbon is bonded to a nonwoven fiber mat. Carbon filters used for protection against toxic chemicals are typically designed to maintain an efficiency of at least 99.999% removal of airborne particulates. An activated carbon filter typically functions by removing molecules from an air stream by adsorption in which molecules are entrapped in pores of the carbon granules. Activated carbon is an effective sorbent for removal of a wide range of chemical vapors due to its extensive microporosity and broad range of pore sizes. In order to filter high vapor pressure chemicals, impregnants are added to the activated carbon. The impregnants react with the gas passing through the filter to form products that are captured by the filter or rendered innocuous. The pressure drop of high-efficiency carbon filters may range from about 1 to 6 iwg at 250–500 FPM approach velocity. These carbon filters also have been used in combination with a HEPA filter.

Activated carbons are useful in respirators, collective filters and other applications, and often involved the use of special impregnates to remove gases that would not otherwise be removed through the use of unimpregnated activated carbons. These impregnated activated carbon adsorption for removal of toxic gases and/or vapors have been known and used for many years. The prior art formulations often contain copper, chromium and silver impregnated on an activated carbon. These absorbents are effective in removing a large number of toxic materials.

For example, it is known that removal of highly toxic chemicals such as cyanogen chloride, hydrogen cyanide and cyanogen can be achieved with the presence of chromium and copper on the activated carbon. Copper and silver impregnants have been shown to be effective in the removal of arsine and phosphine. Chlorine, hydrogen chloride, hydrogen fluoride and hydrogen sulfide are also removed by the presence of copper impregnants on activated carbon.

In addition to a number of other inorganic materials, which have been impregnated on activated carbon, various organic impregnants have been found useful in military applications for the removal of cyanogen chloride. Examples of these include triethylenediamine (TEDA) and pyridine-4-carboxylic acid. In the nuclear industry, the impregnation of charcoal absorbents with triethylenediamine (TEDA) has led to an improved adsorbent with excellent performance in the monitoring and trapping of radioactive iodine and methyl iodide from the off-gases of nuclear reactors The same technology has been extended to the treatment of military charcoal used in respirators for improved protection against small, volatile super-toxic compounds, such as cyanogen chloride, which normally do not adsorb on the charcoal surface to any significant extent.

Various types of high-efficiency filter systems, both commercial and military systems, have been proposed for building protection using ASZM-TEDA carbon for filtering a broad range of toxic chemical vapors and gases. These filter systems have been proposed for integration into the HVAC system of new construction. However, conventional air handling units are not designed to accommodate a large increase in airflow resistance that an activated carbon filter would add. In addition, conventional air handling units have dust filter slots that permit relatively high bypass around the filter media, which not only reduced the overall efficiency of the HEPA filters but also is unacceptable where toxic airborne agents must be entrapped.

FIG. 1 illustrates a conventional HVAC system 100 having limited CBR ("chemical, biological and radiological") filtering capability. An air intake/blower unit 11 incorporates a CBR filtration apparatus. Ideally, such a system would establish a toxic-free area ("TFA") for the occupants in the interior space 17 of enclosure 12 where they would be protected from the CBR threat 16 and could breath the air inside the enclosure without need of a gas mask. As illustrated, the interior space 17 of the enclosure 12 receives and returns air from HVAC unit 10 via ducts 13 and 14, respectively. The returned enclosure air 14 is combined with intake air 18 introduced via the intake/CBR filtering unit 11 to provide combined airflow stream 15 that is inputted to the HVAC unit 10. If more than one outside air intake is used, a separate CBR filtration unit is dedicated to each respective intake.

Consequently, the conventional CBR filtration units have been used as stand-alone units that filter only the outside inlet air, and not the air already in the system, because it was impractical to engineer them to handle the primary airflow in the HVAC system. Conventional CBR filtration unit designs create significant pressure drops in any meaningful airflow passed through them. Therefore, the previous air handling systems providing CBR filtration capability required that a bulky and heavy HVAC unit and a separate CBR filtering/intake unit be transported and installed with all the ductwork needed to support such a system.

The conventional air handling system also has a serious design flaw in that internal CBR contamination events are not resolved. That is, there is no provision for eliminating super-toxic agent contamination of the primary airflow stream being circulated through the system to and from enclosure 12. To reduce the possibility of contaminated outside air infiltrating the interior space 17 of enclosure 12 due to leakage or temporary openings of a door or tent flap to the enclosure, air is introduced into the enclosure 12 at a rate sufficient to produce an overpressure or positive pressure in the airspace 17 of enclosure 12 to create an outward flow of air through any opening(s) in the enclosure 12. To create the positive pressure inside the enclosure, the supply airflow rate to the interior space 17 of the enclosure 12 must exceed the exhaust airflow rate. Toxic-free area enclosures are often designed for a minimum overpressure goal of 5 Pa (0.02 inches water gauge (iwg)). This overpressure corresponds to a wind speed impact pressure normal to a wall of 12 km/hr (7 mph), which is the wind speed condition generally considered to be the most favorable for directing a plume of agent with minimum dispersion toward and outside air intake.

Despite these overpressure measures, the problem is that wind gusts or nearby explosive blasts, or repeated or extended openings of the door/tent flap by occupants, can exceed the overpressure capabilities of a given air handling system. Alternatively, a contaminated person may be brought inside the enclosure for treatment and so forth having volatile or air-dispersible traces of the super-toxic agent contaminating his or her body, clothes or equipment. In the conventional air handling system 100, the CBR filter only decontaminates intake air 18, not the primary airflow 13 being recirculated internally throughout the HVAC system.

Consequently, if and when the air being recirculated within system 100 becomes contaminated, the enclosure 12 can not be maintained in or returned to toxic-free state because the contaminated air will not be effectively removed to a safe level by merely passing it through conventional dust filters, or HEPA filters for that matter if the HVAC unit somehow can tolerate high airflow resistance, installed to filter the main air flow stream in a conventional HVAC unit.

As indicated above, the CBR filtering is restricted to the outside air intake stream in the HVAC ventilation system. In some conventional designs, the rate of intake air introduced is approximately 10% the total volume of air in the system 100. In that scenario, air is only CBR filtered upon introduction into the system, but not during subsequent recirculation cycles in the system 100.

To remove chemical, biological, and radiological agents from air in an environmental space, it has been proposed to use a packed bed of activated carbon, such as using a construction as generally described above. However, with conventional carbon filter schemes, this has the significant drawback of creating a very substantial pressure drop across the packed bed, i.e., the packed bed requires a tremendous pressure force to push the air stream through the packed carbon. The implication of this is that very powerful air handling equipment is required, typically much more powerful than the typical air handling equipment in use at most large buildings or used to serve a large military tent. Therefore, it has not been economically or physically practical to incorporate air handling capability into such HVAC systems that could support CBR filtering of the main flow air.

There is a heightened need for a way of protecting a building or other enclosure against nuclear, biological, and chemical agent attacks, as well as providing a countermeasure to neutralize any internal contamination events. The present invention addresses and solves the above-mentioned problems and shortcomings.

SUMMARY OF THE INVENTION

The environmental control unit ("ECU") of the present invention is a unitary packaged unit suited to provide air conditioning, heating, and CBR filtering protection needs for an enclosure. The enclosure or enclosures that is (are) served by the ECU are expected to be occupied by a person or persons and/or sensitive equipment, and so forth, needing protection from contamination by toxic airborne or air-dispersible agents in addition to any needs for general air handling support.

In one embodiment of the invention, there is an environmental control unit, comprising, as a unitary packaged unit for rapid deployment in the field or for use in an existing structure, a means adapted to receive air conducted via ductwork to the control unit from an enclosed space that is being protected and provided air handling support by the ECU. An air intake blower adapted for intake of a stream of external air into the control unit is included along with means for combining the intake air and air received from the enclosed space to provide an air stream. An important feature is that a filter apparatus adapted to remove CBR agents from the air stream is integrated into the ECU. The CBR filter apparatus used is capable of decontaminating the air stream of CBR agents without rapidly blinding or otherwise unduly interfering with the air stream while traversing the unit. More directly it effectively removes chemical, biological and/or radiological agents without excessive pressure drop in air flow. Due to the usage of high performance CBR filtering apparatus components, it is possible to integrate and employ HVAC components into the same unitary packaged unit to meet the air handling requirements without encountering undue weight or bulk issues that otherwise would frustrate incorporation of CBR filtering means and functionality into the same unit.

The ECU of the present invention also includes a temperature adjustment means for manipulating the temperature of the air stream, before or after the CBR filtering, as well as means adapted for outputting the filtered, temperature-manipulated air stream for conduction of the filtered, temperature-manipulated air stream back to the enclosed space with creation of a positive air pressure in the enclosed space, and a primary air stream blower adapted to draw the air stream into the receiving means and discharge the filtered and heated/cooled air stream from the outputting means.

As such, the ECU can be used to sustain a comfortable breathable atmosphere within a given enclosure for short or prolonged durations of time while protecting occupants or items located therein from contamination by toxic airborne agents. In particular, the ECU protects occupants of the enclosure against external and/or internal airborne release of super-toxic chemical, biological, or radiological agents, while concurrently providing HVAC function.

In one embodiment, the CBR filtering component is incorporated into the HVAC's primary or main air flow stream, such that the entire air stream, and not merely the air intake, receives intermittent, supplemental and continued CBR filtration while being recirculated through the air handling system including the enclosure's air space. The ECU can be implemented to protect and condition the air space within temporary, semi-permanent or permanent structures or buildings. These structures can be stationary or mobile. These structures include tents, office buildings, residential homes, mobile homes, RV's, or other structures or buildings in which partitions or walls define an enclosure in which internal air is separated from external air. The term "external" refers generally to locations outside the enclosure being protected by the ECU, which could be a location in the elements outside the building or structure containing the enclosure, or, alternatively, a location within the same building but outside the enclosure.

In one implementation, the ECU is located outside the structure having an enclosure for which air is protected/decontaminated by the ECU. In another implementation, the ECU is located inside a structure including an enclosure (e.g., a so-called "safe room") to be protected by the ECU. In the latter scenario, the ECU can be installed as a stand-alone air handling unit for the enclosure, or, alternatively, it can be integrated with a standard HVAC system provided for air handling in the structure. The ECU can be located inside the "safe room" itself or in a separate area within the building with air tight ductwork installed that extends between the ECU and the safe room. In one arrangement, when a CBR threat is detected, the enclosure to be protected will have its air space and air handling system isolated from the standard HVAC system via damper control so that the ECU handles all its air handling needs. Alternatively, the enclosure could be maintained as a full time "safe room" in which the safe room's enclosure's air space is kept isolated from the rest of the air space within the building, and the ECU is used continuously or as needed to support the air handling needs of the safe room. In a further embodiment, the ECU used to protect the air of a safe room includes a CBR filtering system, but not an air conditioning or heating system. This is practical because air drawn from outside the safe room but inside the building into the ECU equipped with a CBR filtering system but not an A/C system, can be air conditioned or heated by the separate HVAC system used to handle the air generally inside the building.

For facilities that require continuous operation during a short duration threat with little or no warning, such as a terrorist attack, continuous filtration of the ventilation air intakes should be employed. A CBR system is provided to resist the short duration penetration of agents into a toxic-free area (TFA) where occupants can function without individual protective equipment, a CBR filtration system. For longer term events or where ingress/egress of the enclosure occurs during the event, the CBR filtration system can be provided to provide an overpressure that helps prevent the penetration of agents through the TFA envelope.

In one embodiment of the present invention, the filter apparatus component of the ECU has a design adequate for providing high-efficiency, single-pass filtration of gas phase contaminates, including super-toxic chemical, biological, and radiological agents. In one embodiment, a framed filter includes activated carbon deployed in one or more layers through which the air stream is directed. In one aspect, the filter apparatus generally includes a filter housing having an inlet opening and an outlet opening to permit air to flow in through the inlet opening, through the housing and out through the outlet opening.

The ECU of the present invention can remove chemical war agents, including, for example, mustard (blister agents); sarin (nerve agents); phosgene (choking agents); and cyanogen chloride (blood agents); anthrax (bacterial agents), smallpox (viral or pathogenic agents); as well as industrial pollutants or other toxic agent threats released by accident or act of terrorism, soon after they are introduced into the ventilation system and when recirculated back through the HVAC unit. The ECU can be used as a military, commercial or with a residential HVAC system; an over-pressurization system; and/or a negative air isolation system, which provides highly efficient CBR filtration without causing undue airflow resistance.

DETAILED DESCRIPTION OF THE PREFERRED EMBODIMENTS

As one skilled in the art will appreciate, current heating, ventilation and air conditioning ("HVAC") systems represent a highly vulnerable point in protecting a building or other structure against nuclear, biological or chemical attacks ("NBC attacks"). With the heightened risks of such NBC attacks facing the United States following recent domestic attacks there is a great desire to provide a means to assist in protecting buildings from ultra-toxic gas and particulate threats associated with NBC attacks here in the United States of America, and elsewhere. As the HVAC systems are typically a significant weakness for building security, specifically with respect to nuclear, biological, and nuclear attacks. In addition, military personnel in combat zones where CBR agent attacks are possible may need protection from releases of airborne chemical, biological, and radiological ("CBR") agents in the vicinity of a tent or other mobile enclosure where the troops are bivouacked or have set up a field command or field hospital, and so forth.

In decreasing the risks associated with the HVAC system used to ventilate a tent enclosure, room enclosure, and so forth, the present invention accomplishes this without a significant change in the pressure drop at rated flow-levels for the HVAC system as compared to prior packed bed filters and provides this added safety at a significantly reduced cost as compared to prior packed bed filters currently used to attempt to protect the HVAC system of a building.

The present invention in particular provides protection against airborne chemical agent threats. The ECU system of the present invention is particularly applicable to filtering chemical warfare agents and toxic industrial chemicals and materials.

Figure 1:
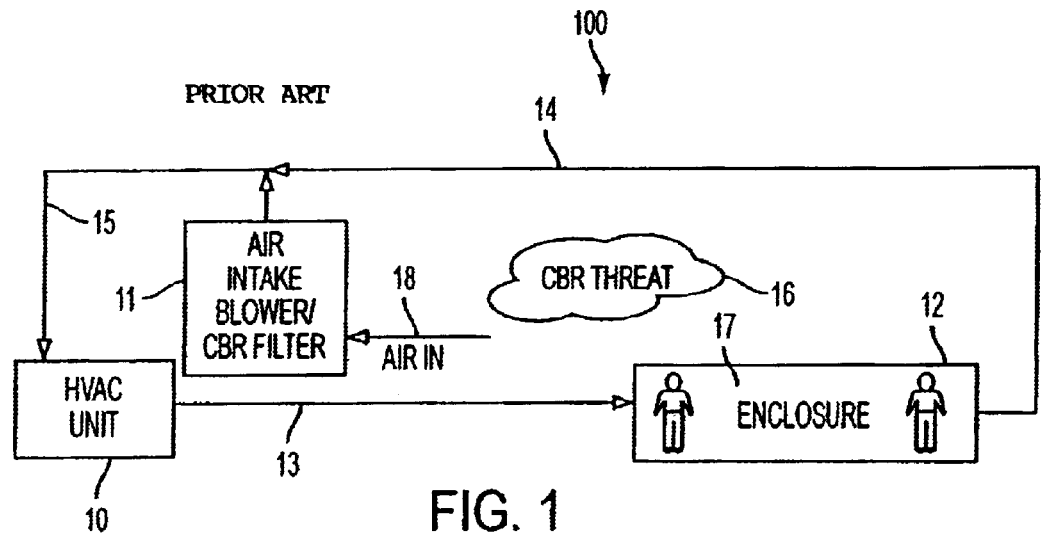
FIG. 1 is a schematic diagram of a conventional air handling system used to protect occupants of an enclosure from an external CBR threat.
Figure 2:
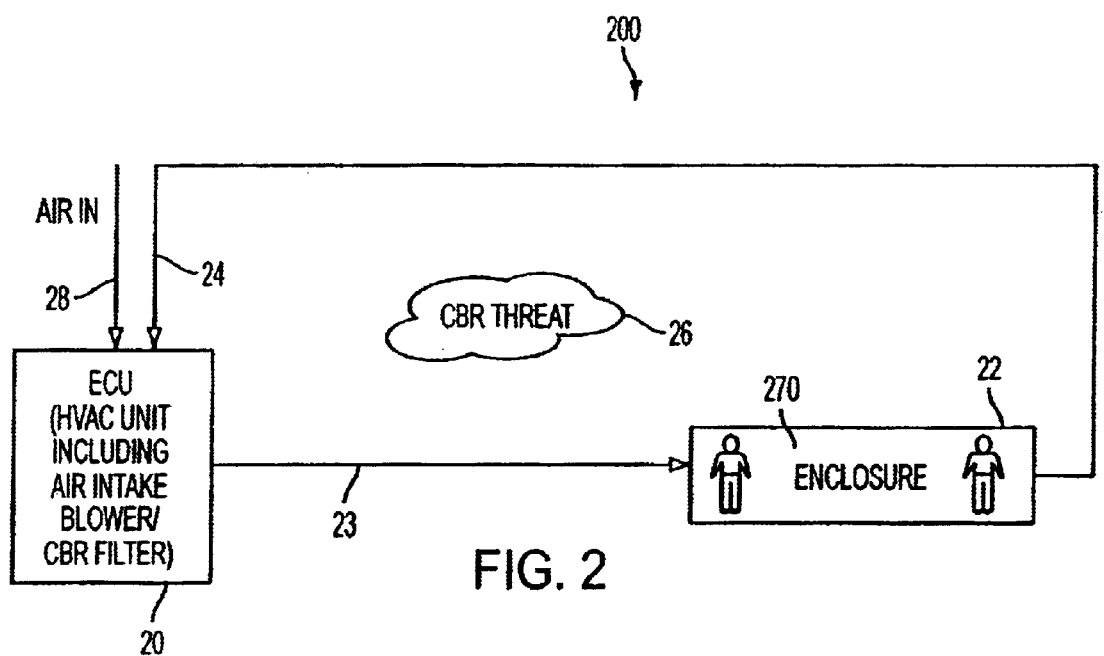
FIG. 2 is a schematic diagram of an air handling system with an ECU according to an embodiment of the present invention used to protect occupants of an enclosure from an external CBR threat while providing HVAC air handling functions.

Referring to FIG. 2, an environmental control unit ("ECU") according to a representative, non-limiting embodiment of the present invention is illustrated in schematic form. In a preferred embodiment, the ECU 20 is a single unitary packaged unit that physically, fluidly and mechanically incorporates HVAC equipment and a CBR ("chemical, biological and radiological") filtering means into a single integrated and unified assembly insofar as all the important components. The ECU 20 can be transported as a single unit to a location where it is desired to deploy it. The CBR filtering capability of ECU unit 20 is applied to the combined air streams of the air intake 28 and the returned air 24 from the airspace 27 within enclosure 22.

The ECU 20 incorporates a filter apparatus that provides effective CBR filtering function without the filtered air stream undergoing a large pressure drop across the filter apparatus. Consequently, the CBR filtering is accomplished without increasing the air handler blower requirements beyond a feasible level for a single packaged unit. This single package innovation was not feasible with prior HVAC systems. Therefore, when deploying system 200, it is not necessary to transport and install separate bulky and heavy HVAC and CBR filtering units.

The air handling system 200 makes it possible to decontaminate and return the enclosure airspace 27 to a toxic-free area after any toxic contamination is introduced therein that is airborne or becomes airborne. For instance, the temperature of the enclosure could be heated to a temperature that is higher than the boiling point of volatile or air-dispersible toxic agents contaminating his or her body, clothes or equipment, that might wet the person, clothing or equipment of an occupant while outside the enclosure, and volatize after the person seeks shelter inside the heated enclosure.

In the present invention, the enclosure 22 and its airspace 27 can be referred to as a toxic-free area ("TFA"), or a so-called "safe room," such as in the case of a building. For purposes of this invention, "toxic-free" refers to an airspace that is or can be rendered free of any level of introduced airborne toxins by the ventilation system 200 that would pose a health threat to the occupants. The system 200 establishes and maintains a toxic-free area ("TFA") for the occupants in the interior space 27 of enclosure 12 where they are protected from the CBR threat 26 outside the enclosure 22 and can breath the air inside the enclosure without need of a gas mask or other special breathing equipment.

Figure 5:
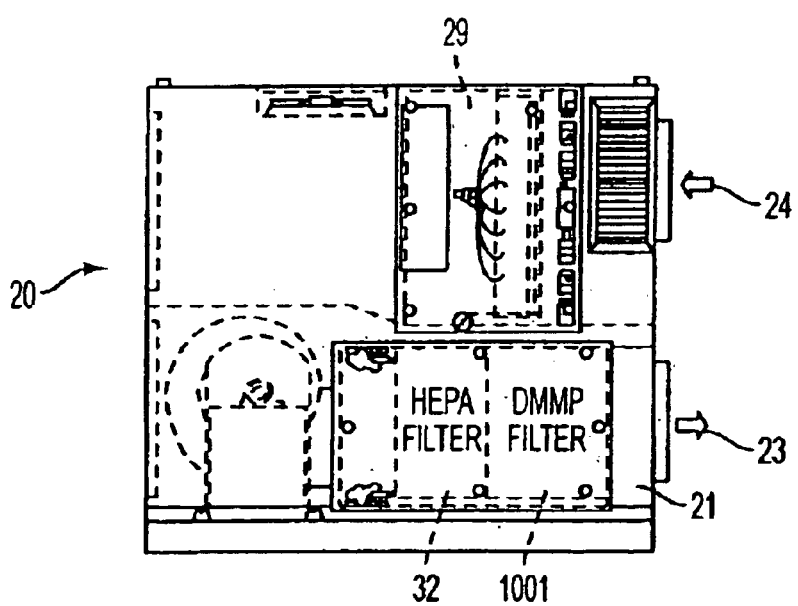
FIG. 5 is a schematic side sectional view of the ECU according to FIG. 3.

As illustrated, the interior space 27 of the enclosure 22 receives and returns air from ECU unit 20 via ducts 23 and 24, respectively. The returned enclosure air 24 is combined with intake air 28 to form a combined air stream 21 at input chamber 25 of the ECU 20. Intake blower fan 29, such as indicated in FIG. 5, creates suction in chamber 25 to pull the added air 28 and return air 24 into the ECU 20. Then, the air stream 21 is commonly and serially filtered through a HEPA filter and a separate CBR filter, and optionally heated or cooled as desired. It optionally is possible to provide an air intake supported by a separate intake blower unit, not shown, that feeds directly into duct 24 before recirculation of the enclosure air back into the ECU unit 20. In the inventive system 200, internal CBR contamination events are resolved as there is a provision for eliminating supertoxic agent contamination of the primary airflow. Dampers, not shown, can be included in ductwork of 23 and 24 of system 200 to regulate the airflow, and/or adjust the pressure conditions in enclosure 22. The air in ductwork systems 23 and 24 typically will be fed into and out of air vents at the enclosure 22. The air vents can include dampers that can be manually or automatically adjusted. A thermostat control can be provided inside or outside the enclosure 22 as a control to regulate the cooling and/or heating equipment.

To reduce the possibility of contaminated outside air infiltrating the interior space 27 of enclosure 22 due to leakage or temporary openings of a door or tent flap to the enclosure, air is introduced into the enclosure at a rate sufficient to produce an overpressure or positive pressure in the enclosure to create an outward flow of air through any inadvertent opening(s) in the enclosure. To create the positive pressure inside the enclosure, the supply airflow rate to the interior space 27 of the enclosure 22 should exceed the exhaust airflow rate. A minimum overpressure goal of 5 Pa (0.02 inches water gauge (iwg)) is preferable to provide a TFA. As noted previously, this overpressure corresponds to a wind speed impact pressure normal to a wall of 12 km/hr (7 mph), which is the wind speed condition generally considered to be the most favorable for directing a plume of agent with minimum dispersion toward and outside air intake. It is also possible to induce an overpressure environment within enclosure 22 by reducing the amount return air 24 by a damper setting adjustment for that ductwork, but this is less preferred in most cases because it is usually desirable, although not required for all instances, that system 200 be operated to decontaminate as much recirculated air from the airspace 27 of enclosure 22 at ECU unit 20 as possible. This can be particularly important where enclosure 22 is subject to internal contamination events after a "safe-sheltering" mode as been initiated, and the ECU's CBR filtering capability needs to be used to decontaminate the primary airflow already in the air handling system, and not just freshly added intake air.

The ECU 20 usually will have an external power supply, not shown, that may be a portable or back-up generator, or power utility, depending on the environment in which the unit is deployed. It is also possible to have an on-board power supply, such as an on-board generator. The power supply is used to power on-board appliances and equipment assembled into ECU 20 that require electricity to operate, such as air handler blower motors, a compressor, and so forth. One or more of these components alternatively could be gas-motor powered, and so forth. A compressor is used in a conventional manner to compress and pump refrigerant through the system. The ECU also will usually include a condenser coil and an evaporator coil, not shown, which can be of conventional designs and functions. Insofar as HVAC function, the ECU can be equipped as an air conditioner or heat pump. If it is a heat pump, the condenser coil not only serves as a heat transfer point for dispelling heat to the outside air in an air conditioner or heat pump in hot conditions, but also for collecting heat from the outside air in a heat pump in cold conditions.

The single packaged unit ECU of the present invention can be used to handle relatively large air conditioning duties in the field or for a conventional building or room(s) therein. For example, the single packaged ECU can provide up to 5 tons, or more, air conditioning. The airflow rate supported by the ECU is not necessarily limited and can be as high as approximately 2,000 CFM or more. For purposes herein, a "ton" means a unit of measurement for determining cooling capacity where "one ton" equals 12,000 British Thermal Units per Hour (BTUH). The ECUs of the present invention can be and are implemented to deliver SEER efficiency ratings of at least 10 or higher. The ECU has physical dimensions that accommodate its transport to an installation location, whether temporary or more permanent, as a single unitary packaged unit.

FIGS. 3–5 are an illustration of one embodiment of the ECU 20 used in the invention. ECU 20 is illustrated as a package unit that it is a self-contained air conditioning unit that includes both the evaporator and condenser sections within a single cabinet. If heating function is additionally desired, it could be accomplished either by an add-on to the system such as an electric heat strip, or by a separate unit from ECU 20, not shown, such as a furnace. Alternatively, the ECU 20 can be arranged as a heat pump or as a so-called "gas pack" in which heating and cooling modules are located in one case. In the instance of a heat pump located outside a building, if the outdoor environment in which the ECU has been installed is anticipated to fall below 30° F. (−1C.), it can be supported by an add-on electric heat strip, or a furnace as a separate unit from ECU 20. Humidifier or dehumidifier subsystems also optionally could be included in ECU 20. However, in all these variants of HVAC systems, they commonly will integrate a CBR filter means within the same cabinet that does not create an untenable air flow resistance within the air handling system.

FIG. 3 illustrates intake air stream 28 and main airflow stream 24 being converged and merged together at an intake manifold 25 at the suction side of the ECU 20. As shown, a standard dust filter 27 optionally could be installed at this location of the ECU unit to filter the return air to remove any relatively large solid dust, pollen, soot, or other debris in particulate form before the air stream is ultra-filtered to remove any CBR agents and heated/cooled. A condenser coil fan 30 is illustrated in FIG. 3. As best seen in FIG. 5, a main air intake blower fan 29 creates the suction at the intake manifold 25 to draw air streams 24 and 28 into ECU 20. In one embodiment, main air intake blower fan 29 also pushes the combined air stream 24/28 through the ECU 20 and back out an exhaust manifold 21 after being CBR filtered and cooled or heated as applicable. The intake blower 29 and condenser coil blower each are driven by motor, not shown.

As illustrated in FIG. 4, in this embodiment, a HEPA filter 32, and CBR filter apparatus 1001, which can have a structure as described in greater detail below in the discussions of FIGS. 6–13, are installed in series. The HEPA filter 32, which can have a conventional design, is optional, and provides for further removal of solid or liquid airborne particulates having a particle size greater than 0.3 microns, but not any smaller particles or gaseous agents to any effective degree. The use of the prefilter 27 and HEPA filter 32 help to remove relatively larger solid and liquid airborne particulates from the air stream 24/28 without needing to rely on CBR filter for that duty. In this manner, the efficiency of the CBR filter 1001 is not diminished by being used to intercept debris and particles that are not target agents for that filter. As can be appreciated, dusts and pollens in the air stream that otherwise could become entrapped upon the ultrahigh efficiency CBR filter, if not prefiltered, can clog its pores and lower its efficiency as it becomes blinded by such nontarget debris. To the extent such a HEPA filter 32 is included, a separate filter fan can also be included in the ECU 20 to reduce the load on intake blower 29.

As indicated in FIGS. 3–5, the ECU can be assembled with all its essential parts in a general box-like shape well-suited for transport and handling. For example, larger capacity versions of the ECU of the invention having a weight or increased bulk unsuited for manual handling, can be temporarily mounted on a single pallet for transport, and handling by equipment such as a forklift, crane, helicopter, and so forth. Smaller capacity versions of the ECU of the invention described herein have bulk and weights amenable to being moved by being carried by one or two persons, or via hand-truck.

The ECU can have an on-board gas-powered motor, or, alternatively, it can have an electric motor drive system, for the blowers. For example, the ECU can be adapted to include electric motor drive means powered by utility power and/or a separate gas-powered generator.

While the illustration in FIG. 2 is directed to an ECU in which HVAC function is provided outdoors via air conditioner, gas pack, or heat pump equipment in the ECU, it is also possible to implement the present invention in a split HVAC system combining a heat pump or air conditioner that includes not only an outdoor unit but also indoor components, such as furnaces or blower coils.

In yet another embodiment, an ECU unit 201 is installed inside a building 610 to protect a given room or room therein from CBR threats or attacks occurring outside that room or rooms. The buildings contemplated in this arrangement include, for example, residential homes and office buildings, that include an enclosure that occupants desire to use as a "safe room" in the event of a CBR threat or actual attack.

Figure 6:
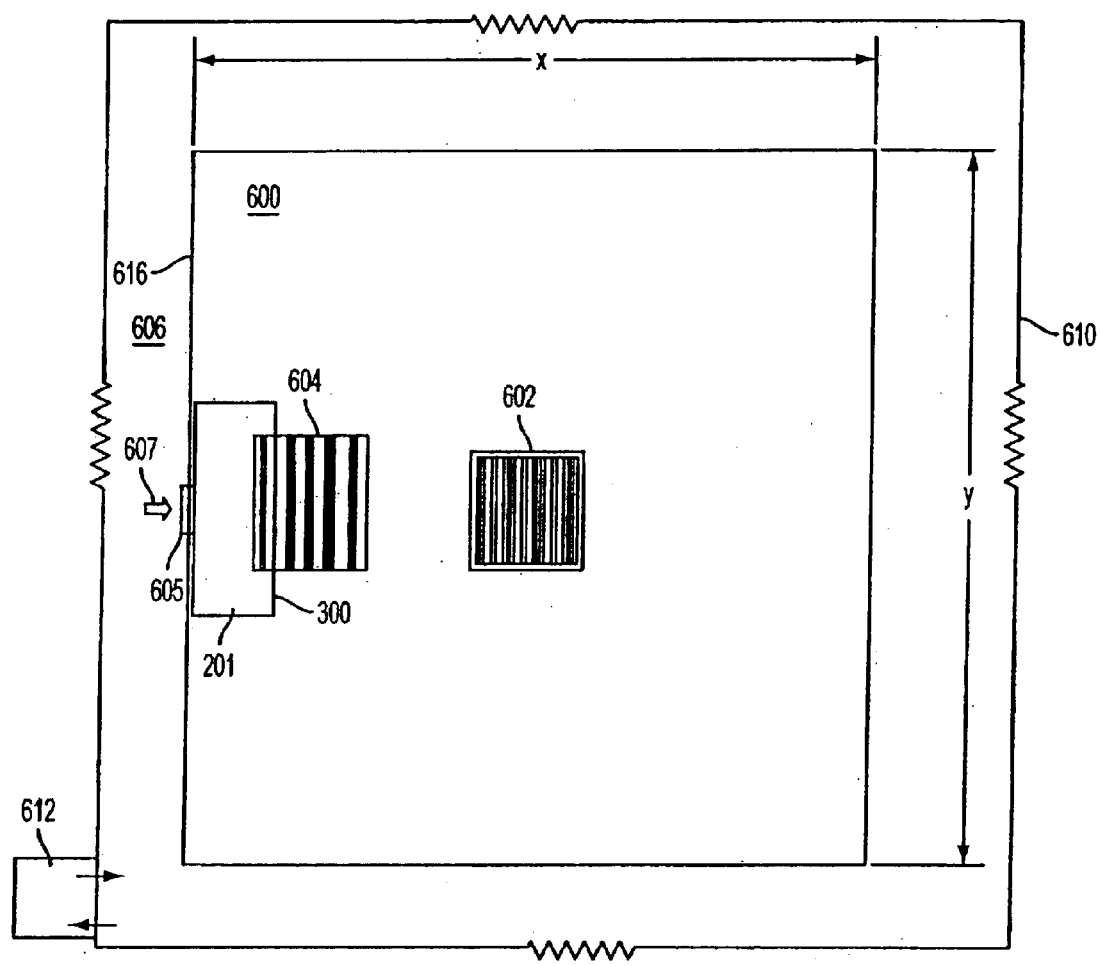
FIG. 6 is a schematic plan view of an air filtering system providing CBR filtering function to protect occupants of a "safe room" or enclosure located inside a building from an external CBR threat according to another embodiment of the present invention.

As illustrated in FIG. 6, in this embodiment, an air handling system 300 including an ECU unit 201 is provided to protect a specific enclosure or room 600 housed within the building 610 in the event of a CBR threat or actual attack that either originates outside the building (not shown) that may penetrate into the airspace within the building. This protected room may be designated as a "safe room." Alternatively, the ECU 201 can be used to protect the safe room 600 against a CBR attack that originates or is created by contamination from outside air within a building 610 but outside the safe room 600.

The ECU unit 201 can be used to recirculate the air in the room while providing positive or negative pressurize the room 600 depending on the event requirements. In the implementation shown in FIG. 6, the safe room 600 has its air protected by an ECU 201 housed within the same building 610. In the non-limiting illustration provided herein, an ECU 201 is located inside an enclosure (e.g., a so-called "safe room") 600 to be protected by the ECU 201. The ECU 201 has an air intake manifold 605 connected through an opening made in a side wall or partition 616 and includes a supply register that opens into the airspace 606 in the adjoining room or area within building 610. Air flow 607 is drawn into ECU 201 from airspace 606 located outside safe room 600 but inside building 610. Since the building 610 will usually have a standard HVAC unit 612 providing air conditioning and/or heating of air circulated throughout the air space within building 610 including airspace 606 at the intake register or duct 605 for ECU 201, it is possible to reduce the systems required of ECU unit 201 to include only the CBR filtering system and associated function.

Figure 7:
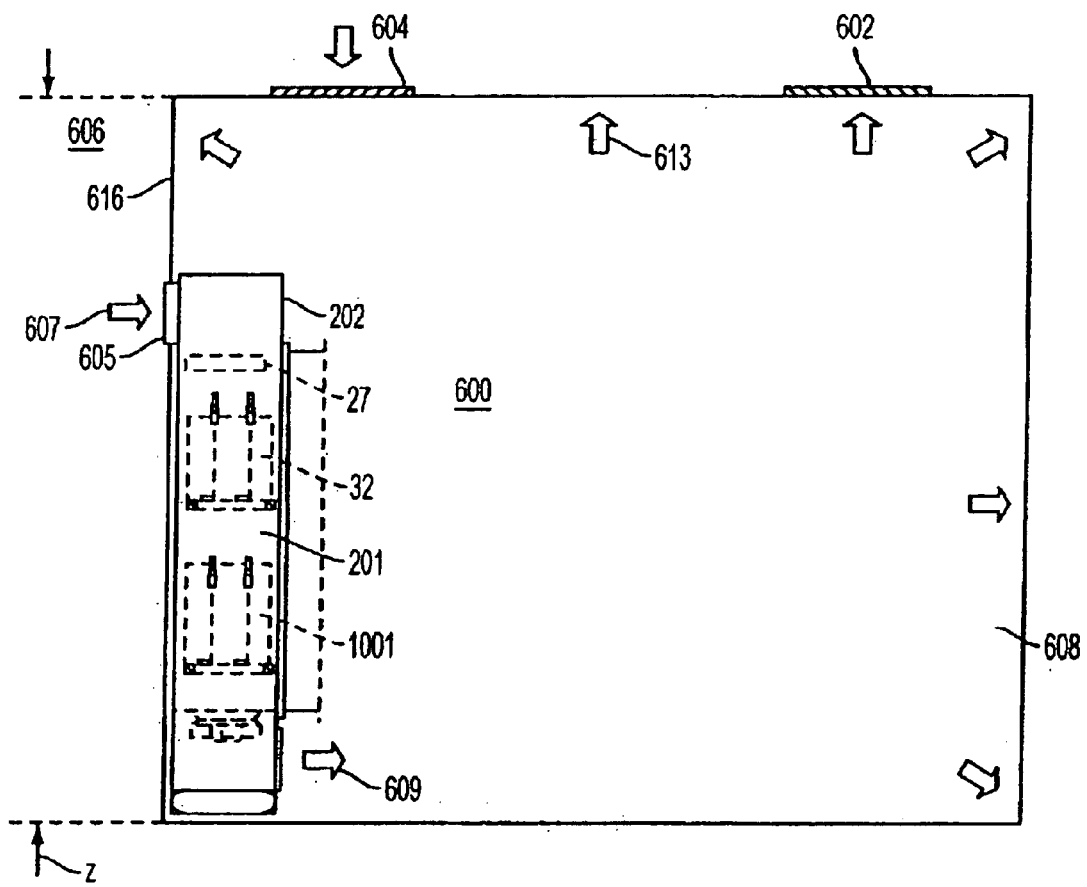
FIG. 7 is a schematic side view of the air filtering system illustrated in FIG. 7.

As indicated in FIG. 7, supply air register 604 and return air register 602 permit circulation of air between the safe room 600 to the buildings general HVAC system during normal times when there is no CBR threat or attack. In FIG. 7 black arrows (e.g., 609, 613) are included to illustrate air flow. In a preferred mode, both the supply air register 604 and return air register 602 are closed in an airtight sealed manner when the safe room 600 is isolated due to a CBR threat or attack. Thus, the enclosure 600 is air tight other than air brought in through ECU 201, which is CBR filtered by that unit before release into the airspace 608 of the enclosure 600. Alternatively, the supply register 604 could be closed and return air register 602 left open or partly open if a high enough positive air pressure is created in the air space of room 600 to prevent contamination of the safe room via the open or partly opened return register 602. The fan blower unit installed with ECU 201 will have a power and capacity selected given the room air space involved to support these scenarios. In another alternative embodiment, it is possible to include independent A/C and/or heating systems and functions in ECU 201 with the recognition that including those additional functionalities may be duplicative and entail more cost. In one embodiment, an "enclosure" means an air space defined by walls on all sides inclusive of airtight, sealed dampers, windows, and the like incorporated into the walls, except for any opening or openings through which intake air can be received from the outside of the enclosure but only after being first fed through the ECU filtering unit 201 before released into the enclosure's airspace.

Figure 3:
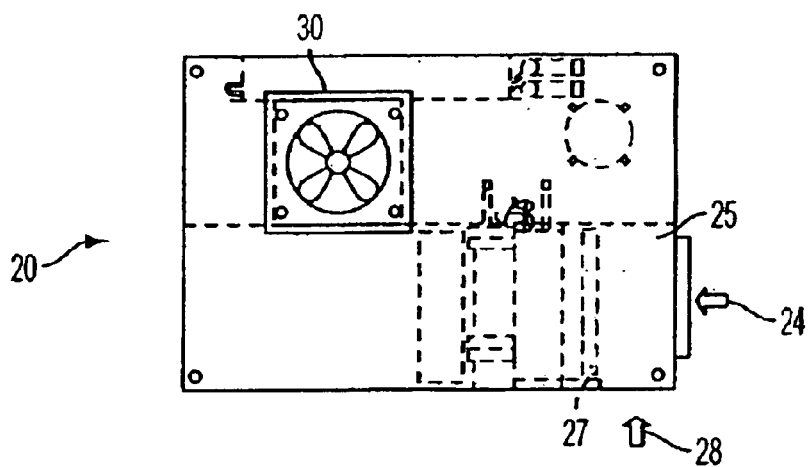
FIG. 3 is a schematic top sectional view of an ECU unit useful in the system illustrated in FIG. 2, according to an embodiment of the present invention.
Figure 4:
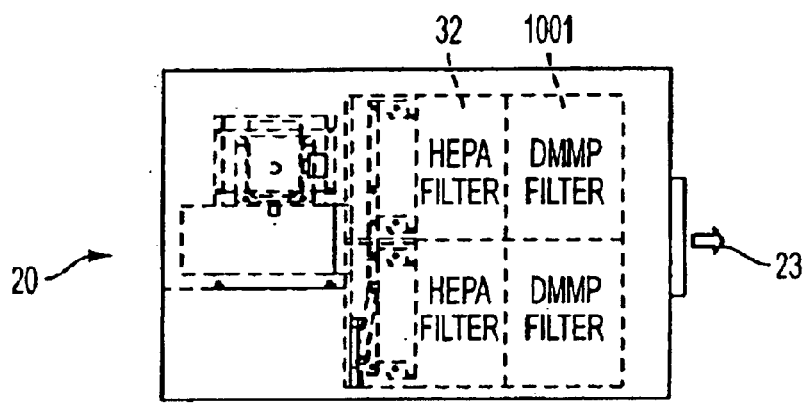
FIG. 4 is a schematic bottom sectional view of the ECU according to FIG. 3.
Figure 8:
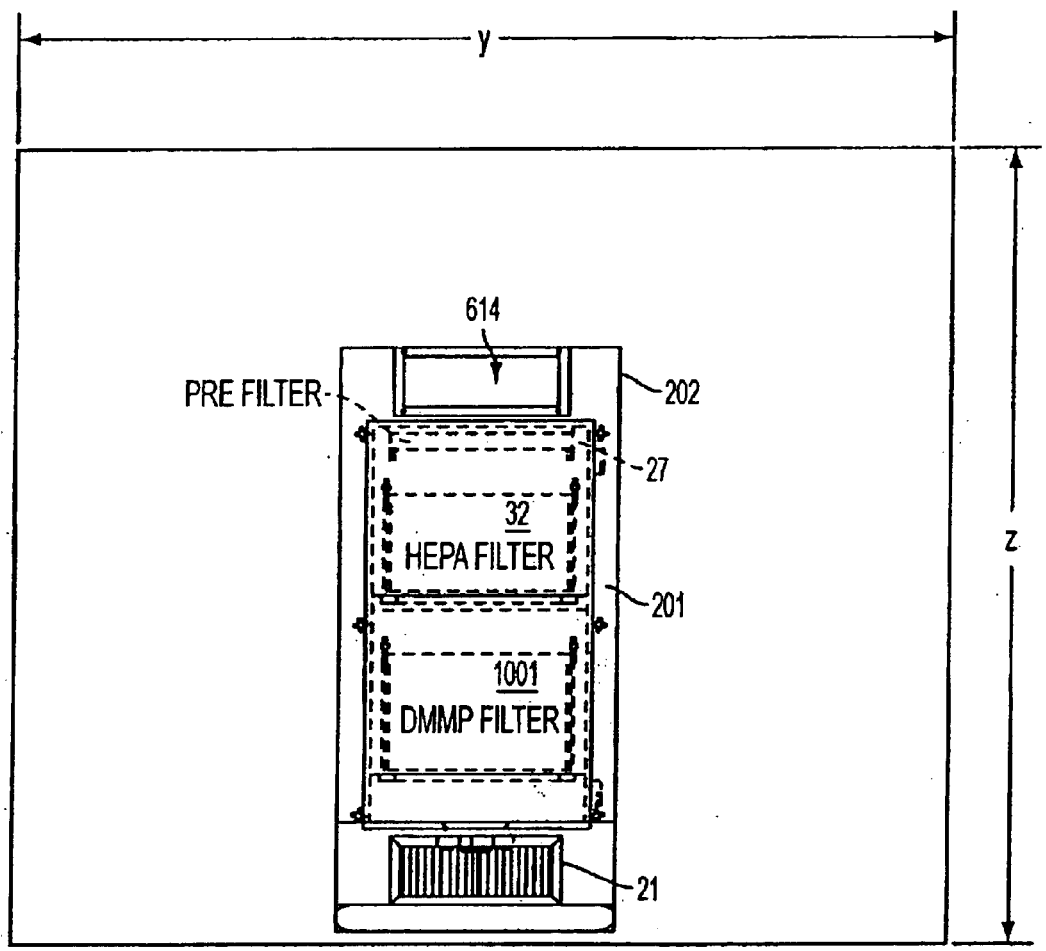
FIG. 8 is a schematic front view of an exemplary CBR filtering unit useful in the system illustrated in FIG. 6, according to an embodiment of the present invention.

FIG. 8 shows one exemplary configuration of the ECU unit 201 used to house at least a CBR filtering system. The air intake manifold receives air drawn into ECU unit 201 by a blower fan arrangement (not shown), which can be a unit such as that as generally described in connection with FIGS. 3–5, and the intake air is sequentially fed through a standard commercial or similar dust filter 27 to remove relatively large macroscopic debris in the air stream, then a standard commercial or similar performance HEPA filter 32 to remove finer particulates, then the CBR DMMP filter 1001 to remove microscopic particles and gases beyond the capabilities of the HEPA filter, and the decontaminated air is discharged via discharge manifold 609 back into safe room air space 608.

Referring to FIG. 8, in another embodiment a removable plate 614 is provided on ECU unit 201 that covers another intake manifold to the unit. The removable plate 614 has a gasket (not shown) for making an air tight seal with the frame 202. When the plate is attached in place, the unit 201 can be operated to pressurize the room. When plate 614 is removed, the ECU unit 201 will draw in intake air from room 600 through that opening for recirculation through unit 201, while the unit 201 also separately draws in intake air via intake 605 that is pulling in air from adjoining room 606.

The ECU 201 can be housed, for example, in a 14 gauge galvanized steel construction frame 202. Extruded aluminum filter tracks with woven nylon pile seals can be incorporated into the frame 202 to retain the various filters in place, in a manner that is generally known. The frame usually will have a hinged door, doors or removable frame piece to permit access to the filters for examination, installation and replacement. In one aspect, the door perimeter is sealed with a closed cell neoprene gasket or the like. In another aspect, the filters can be sealed against the door with urethane foam mounted inside the doors. Preferably, metal to metal components of the ECU 201 are sealed with a silicone compound or the like. The blower can be powered by a conventional motor and drive system useful generally for air handling applications, such as a 0.25 hp, single phase, 120v commercial or similar fan motor. Although not limited thereto, to give sense of scale involved with ECU unit 201, for example, the standard dust filter used may be a rectangular shaped filter having dimensions of 12 inches×24 inches×⅜ inch (nominal sizes of width-length-depth); the HEPA filter may have dimensions of 12 inches×24 inches× 12 inches; and the DMMP filter may have dimensions of 12 inches×24 inches×16 inches. The dimensions of the various filters can vary depending on the capacity requirements associated with the particular "safe room" to be protected.

In one arrangement of the "safe room" system embodiment, the ECU can be installed as a stand-alone air handling unit for the "safe room" enclosure to be protected. Alternatively, the ECU can be integrated with a standard HVAC system provided for air handling in the structure. In this integrated arrangement, under normal, non-CBR threat conditions, the buildings HVAC system can be used to condition air of both the safe room enclosure space and the air space outside that enclosure in other areas within the same building. Damper control is provided which, by manual control of an occupant in or outside the "safe room" enclosure, or by automatic control, isolates the ductwork supporting the air handling between the ECU and the enclosure from the remainder of the ductwork used for the HVAC system supporting the rest of the building. A pressure gauge can be used to monitor the pressure condition within room 600, and that information can be used to adjust settings on the dampers and/or ECU unit 201. In the automated control mode, for example, a CBR sensor or "sniffer" detector could be used in combination with a microprocessor and electromechanical means to activate and re-position HVAC dampers effective to isolate the safe room airspace from the rest of the building's HVAC system. Alternatively, a CBR sensor could be used to raise an alarm to alert an occupant of the need to manually re-position or configure the HVAC system dampers effective to isolate the safe room air space such that its intake and system air is conditioned exclusively by the ECU.

Alternatively, the enclosure could be maintained as a full time or continuous isolation room in which the room's enclosure's air space is kept isolated from the rest of the air space within the building at all times, and the ECU is dedicated for continuous usage to support the HVAC air handling needs of the safe room. For example, this arrangement could be used to isolate hospital ward rooms or areas in which CBR-contaminated patients or patients being treated for highly dangerous diseases or conditions. Alternatively, it could be used to protect individuals having heightened concern about and/or heightened sensitivities or vulnerabilities to illness-causing organisms or substances. In yet another alternative, the "safe room" receives no air handling support by the structure's general HVAC system used to support the rest or other significant air space within the same building, and only receives air handling support from the ECU when it is activated as an intermittent or isolated event mode of operation of the ECU system.

In the embodiments in which the ECU is deployed inside of a building or structure, the unit has the same basic features at least insofar as the CBR filtering system as described above, but can be scaled down is dimensions and weight depending on the enclosure airspace that needs to be handled. For example, and not by way of limitation, an ECU unit having a weight of approximately 200 lbs. (91 kg) may be sufficient to support a room, such as one, for example having an air space defined by an enclosure of approximately 10 feet×10 feet×8 feet (e.g., dimensions x, y, z in FIGS. 6–8). Although not limited thereto, the ECU illustrated in FIGS. 6–8 may have a size, for example, of about 3 feet wide×about 1 foot deep×about 6 foot high.

In one non-limiting embodiment, the CBR agent filter apparatus 1001 deployed in the ECU 20, and/or ECU 201, utilizes a pleated absorbent filter medium containing a specific grade of activated carbon and with the particles of absorbent packed as to limit significant axial dispersion of the adsorption wave moving through the filter medium. The activated carbon is preferably activated carbon impregnated with Copper-Silver-Zinc-Molybdenum-Triethylenediamine (ASZM-TEDA) grade, which is specifically optimized for use in chemical warfare applications. It can be purchased, for example, from Calgon, Inc. (Pittsburgh, Pa.). Otherwise, the activated carbon used may be virgin coconut shell activated carbon, which is effective in adsorbing many war gases other than certain high volatility war gases such as hydrogen cyanide, and the like.

Typically ASZM-TEDA carbon is manufactured in a 12×30 mesh and then the carbon is incorporated into the medium. In the present invention the carbon is then reduced to a finer mesh size to obtain enhanced cyanogen chloride ("CK") reduction. Preferably, the carbon is layered or "sandwiched" between two layers of a non-woven substrate, preferably a spunbonded polyester non-woven fiber. These three layers create a multilayer material. This multilayer material is then "pleated," preferably so that there is a pleat density of between approximately one (1) and three (3) pleats per inch, and more preferably about 1½ pleats per inch. The pleated multilayer material is then placed inside a filter pack. This filter pack preferably has a height and width of 24 inches by 24 inches, which is the typically the inner size of a filter housing, such as an HVAC duct or the like. Each pack is sealed about the edges of the pack, which preferably contacts the inner edges of the filter housing, or at a minimum prevents or decreases the flow of air around the packs. The sides of the packs are sealed using hot melt adhesive, while the top and bottom are sealed using polyurethane. To seal the housing itself to external HVAC equipment, an unshown gasket is employed. These gaskets may be made of a multitude of materials, including rubber, plastic, and the like. Preferably the gaskets are made of a closed cell neoprene. Preferably, the depth of each pack is four inches. The seals thereby preferably create an inlet opening and an outlet opening, each having approximately 576 inches square of profile area, and as there are preferably 1 and ½ pleats per inch, and as each pleat preferably has approximately eight (8) inches of length, providing approximately four inches front to back and four inches back to front for each pleat, and so that each pack has more than 6000 square inches of total surface area per pack.

Finger arrays are preferably included inside each of these packs to keep the pleats open. These finger arrays need not be inter-connected with one another. The finger arrays assist to ensure the pleats do not collapse or substantially move due to the airflow from the filter housing and the combined filter system. Additionally it is preferable that the finger array assists in spreading the pleats to assist in obtaining a substantial contact area. The finger array may be made of plastic, wood, metal or cardboard, and is preferably made of a high impact plastic.

It is preferable that a plurality of above discussed packs are utilized for each filter system, and are placed back-to-back, or outlet-to-inlet, so that when so arranged, air may flow through the plurality of packs. It is preferable to utilize two (2) to six (6) packs and more preferable to utilize four (4) such filter packs stacked back-to-back. Four such panels would create a plurality of packs having a dimension, in inches, of 24×24×16. In experiments, it has been shown that when using four (4) such packs, which contained approximately 60 lbs of carbon, the low pressure drop was only 0.25 inch W.C. at a flow rate of 500 scfm, or 0.7 inch WC at a flow of 1000 scfm. Other filter system configurations that produce the same results can also be used within the unit.

Figure 9:
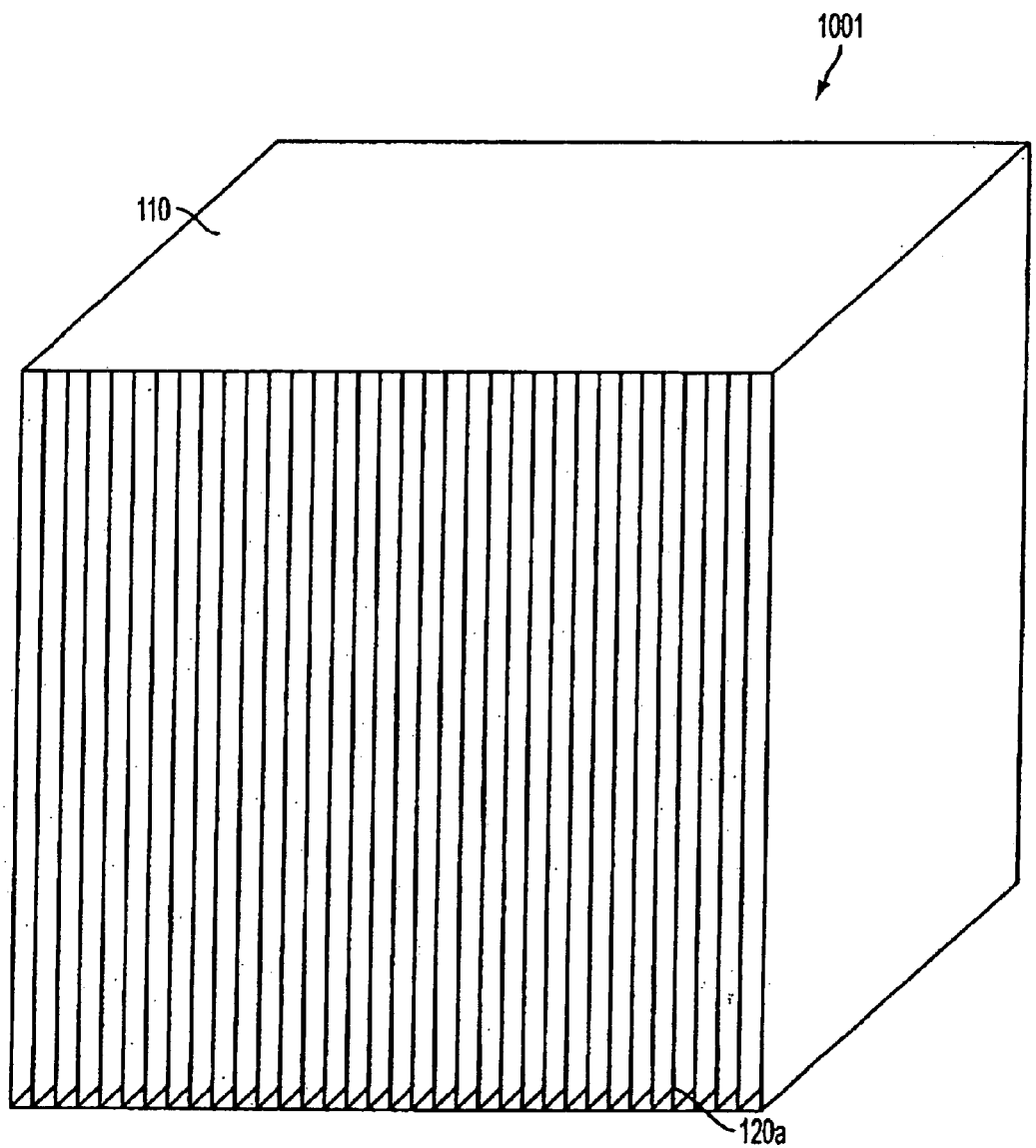
FIG. 9 is a schematic, front perspective illustration of an exemplary nonlimiting filter apparatus that can be used in an ECU according to the invention.
Figure 10:
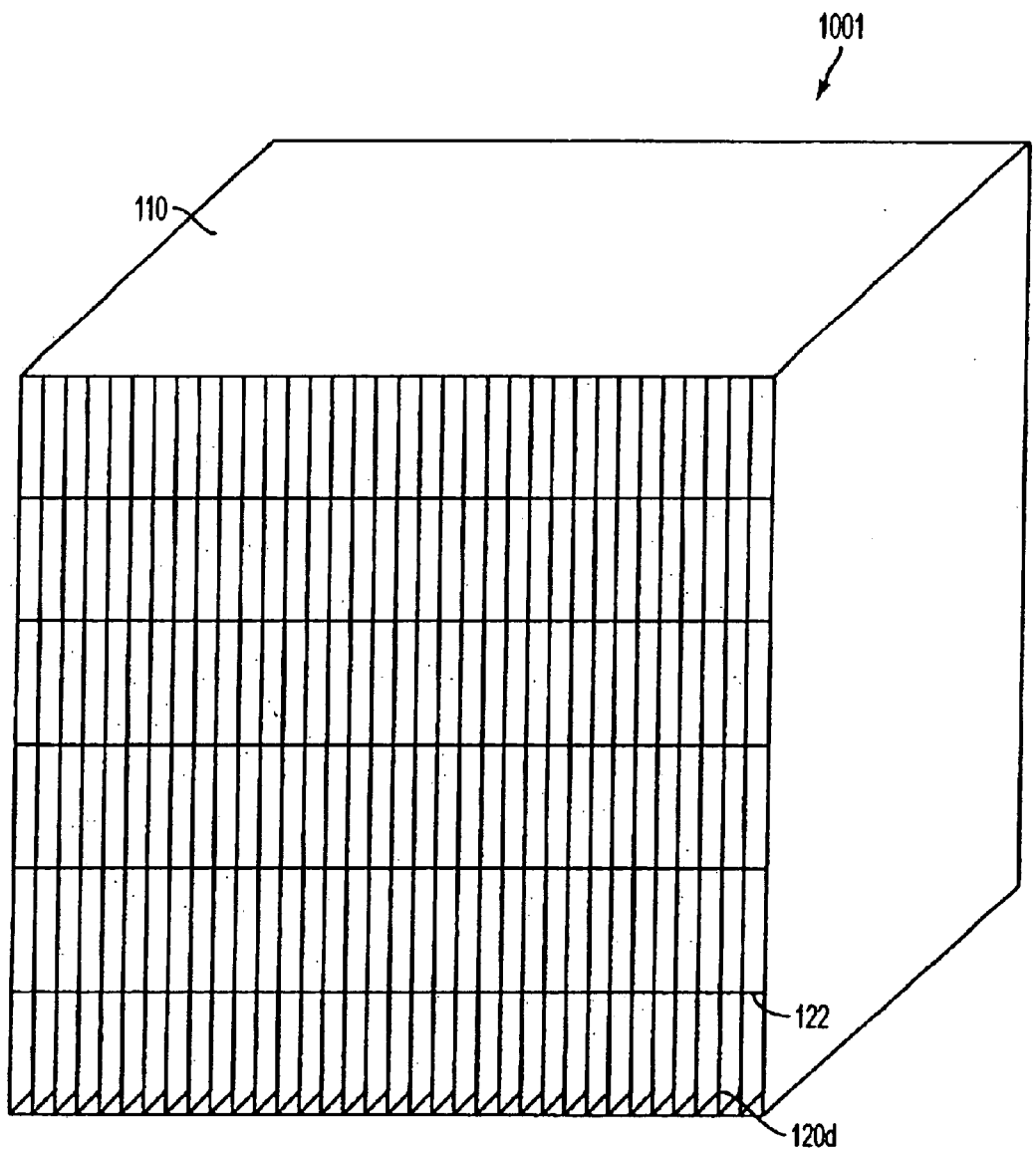
FIG. 10 is a schematic, rear view perspective illustration of the filter apparatus of FIG. 9 used in an ECU according to an embodiment of the invention.

As shown in FIG. 9, (a schematic of a front perspective view) an exemplary CBR filter apparatus 1001 has a filter housing 110, and visible from the front side of the filter apparatus 1001 and contained inside, is a first filter pack 120a. As discussed prior, a plurality of filter packs, e.g. filter packs 120a–120d, are preferably contained within the filter housing 110. The direction of the inlet airflow 130 is toward the inlet side of the first filter pack 120a. The inlet airflow 130 is preferably from the heating or cooling element(s), or the like, of the HVAC system. As shown in FIG. 10, which is a schematic of a rear perspective view of the filter apparatus 1001, the last filter pack 120d is visible. Additionally, from the outlet side of the last filter pack 120d comes the outlet airflow 132, which preferably toward the vents for the building or, structure utilized by the HVAC system. A plurality of fingers 122 are also visible on the backside of the last filter pack 120d. As discussed prior these finger assist in ensuring that the pleats do not move substantially, or collapse altogether, thereby assisting in maintaining the surface or contact area provided by the pleating of the multilayer fiber.

Figure 11:
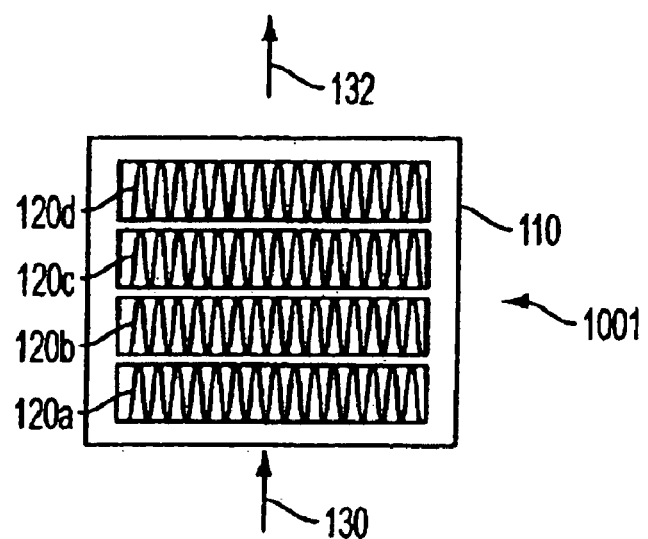
FIG. 11 is a schematic sectional top view of the filter apparatus of FIG. 9 used in the ECU according to an embodiment of the invention.

FIG. 11 depicts a schematic of a sectional view of the filter apparatus 1001 from above. A plurality of filter packs, 120a–120d, are aligned back-to-back, or outlet-to-inlet, e.g. outlet of filter pack 120a to inlet of filter pack 120b, and so on, and are located inside the filter housing 110. The inlet air 130 flows into the plurality of packs at the inlet side of filter pack 120a and the outlet air 132 flows from the outlet side of filter back 120d.

Figure 12:
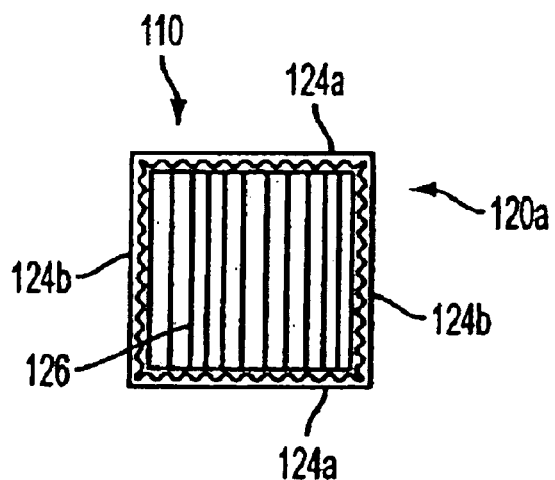
FIG. 12 is a schematic sectional front view of the filter apparatus of FIG. 9 used in the ECU according to an embodiment of the invention.

As shown in FIG. 12, which is a schematical sectional view a of the first filter pack 120a, within the housing 110 showing that the filter pack 120a has an upper and lower seal 24a of polyurethane, which can be a potting material that is cured in place, and side seals 124b of hot melt adhesive, preferably a hot melt glue. The housing 110 can be a 16 ga. galvanized steel frame.

Figure 13:
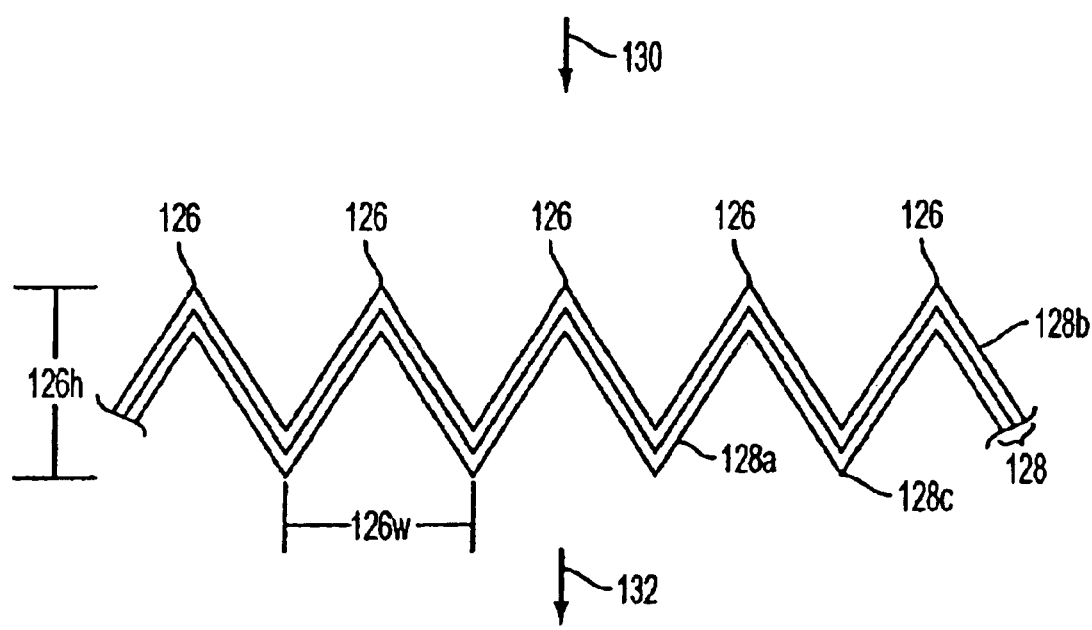
FIG. 13 is a schematic sectional view of a pleated filter element portion of the filter apparatus of FIG. 9 used in the ECU according to an embodiment of the invention.

The filter pack additionally has pleats 126 which preferably traverse a single direction. As shown, in FIG. 13, which is a cross-section view of a filter pack, the pleats 126 are preferably V-shaped in nature, however; as discussed prior, it is preferable to have the "V" be much "narrower" than is depicted as the height of the pleat 126h, as compared to the width of the pleat 126w, for example, such as in approximately 6:1 ratio thereof, respectively (e.g., about 4 inch height and ⅔ inch width). The pleats 126 of the pack 128a are preferably made of a multilayer material 128, which has an inner activated carbon layer 128a, and two outer layers, inlet layer 128b and an outlet layer 128c, each preferably comprised of a non-woven material. The multilayer material 128 may be created by distributing activated carbon particles 142 over a moving web of the bottom non-woven layer 128c. Following this, the top layer 128a is placed on top of the activated carbon layer 128a.

The peaks of a spreader finger array 122 may be rounded to match the points of the pleats 126 of the pack 110. It will be appreciated that the inventive ECU is not limited to the above-exemplified filtering apparatus. The ECU can utilize other types and schemes of filter modules available or obtainable to the extent they provide comparable filtering performance and filtering functionality. For example, other CBR filter grade module designs could be used that meet the filtering requirements described herein containing one or more fibrous layers and activated carbon or otherwise carbon modified for this application.

In one preferred embodiment, each filter apparatus is tested and packaged in accordance with applicable sections IEST-CC-RP-008-84. For quality control, it is further preferred that each production lot of filter apparatuses is subjected to random selection of at least one filter unit from the lot that is/are independently tested (i.e., "destructively challenged) to determine if the filter unit is at least >99.99% efficient in filtering out DMMP introduced at the intake side of the filter unit at a minimum of 500 mg/m$^3$ dimethylmethylphosphonate (DMMP), for at least 20 minutes at 250 fpm (feet/min.) face velocity. Samples of filtered air that had passed through the filter unit are analyzed intermittently by any suitable analysis technique known in the industry for measuring DMMP levels in air. The basic protocol of a suitable version of this test is described in Filtration News, vol. 20, No. 4, pp. 22–26. 2002, which testing protocol descriptions are incorporated herein by reference. In a preferred embodiment, failure of one randomly selected filter unit in a production lot fails the entire lot. DMMP is a chemical agent similar in composition to Sarin and it is currently used by the US Army to measure ultra-high efficiency carbon adsorber life.

Examples of chemical warfare agents that the present invention can be used to protect the airspace of an enclosure against include, but are not limited to, nerve agents, blister agents, blood and choking agents, and so forth.

Nerve agents include Sarin (GB, 107-44-8), cyclosarin (GF), VX (50782-69-9), and Tabun (GA, 77-81-6). These nerve agents are chemically similar to organophosphate pesticides, but are up to a thousand times more potent. GB has an $LCt_{50}$ (vapor) of 70 mg min/m$^3$. While relatively more toxic than GB, VX also has a much lower volatility and thus poses less of an airborne threat to occupants of buildings and other enclosures receiving conventionally filtered air. The Airborne Exposure Limit for the nerve agents GB, VX, GA or GD, as recommended by the Surgeon General's Working Group, U.S. Dept. of Health & Human Services, is 0.003 µg/cm$^3$.

As generally known, these nerve agents, such as sarin, disrupt normal functionality at the synapses between nerve cell pairs, such that targeted nerve cells continue to be stimulated long after the original impulse is transmitted. This causes uncontrollable and repetitive contractions in muscles and secretions of glands controlled by the targeted nerve cells. As also generally known, treatment of a person who has already been exposed to one of these nerve agents and is experiencing convulsions requires immediate access to the antidote atropine to halt the uncontrolled stimulating action occurring at the exposed nerve cells, and also administration of praxidoxime chloride (2-PAM) to restore normal nerve transmission. These drugs are highly regulated, controlled substances, and are not always readily available, especially if the attack occurs in a civilian locale. Consequently, a highly desirable practical defense against a nerve agent attack is avoidance of exposure to begin with. As it generally will not be practical to have gas mask handy at all times, especially in "non-combat" settings, an ideal solution, if feasible, is taking shelter in an isolated enclosure ventilated by an air handling system having CBR filtering capability. The ECU of the present invention is useable to make that function and capability attainable.

The ECU of the present invention also offers protection against blood agents, such as cyanogen chloride (CK), arsine (SA), hydrogen chloride (AC), or hydrocyanic acid (HCN). Blood agents produce their effects by impairing cellular oxygen use. Inhalation is the usual entry route. In high concentrations, the amount of CK or AC inhaled in even a few breaths may be enough to cause rapid death, while even exposure to lower concentrations for a sufficient duration of time can lead permanent injuries or death. The present invention also protects against choking agents such as phosgene, chlorine, and so forth. CK also has a choking effect.

The ECU of the present invention also can be used to protect against blister agents, or "vesicants," which include mustard agents, such as nitrogen mustards (HN-1, HN-2, HN-3), sulfur mustards (H, HD, HT), and mustard-lewisite (HL). Mustard agents pose both a vapor and liquid threat. Mustard agents can pose more of a threat to occupants of an enclosure receiving conventionally filtered air when the air temperature exceeds their boiling point of about 50° F.

The ECU of the present invention offers protection against the above chemical threat agents, and also airborne toxic industrial chemicals such as organic vapors (e.g., cyclohexane), base gases (e.g., ammonia), acid gases (e.g., cyanogen chloride, hydrogen sulfide), and other dangerous agents (e.g., formaldehyde).

The present invention also provides protection against airborne biological agent threats, such as bacterial, viral or pathogenic agents. These airborne biological threats can include, for example, anthrax, botullinum, gas gangrene, aflatoxin, plague, smallpox, Ebola, tularemia, ricin, rotaviruses, and hemorrhagic viruses.

The present invention additionally provides protection against airborne radiological agent threats such as alpha, beta and gamma radiation.

While the invention has been disclosed in preferred forms, those skilled in the art will recognize that many modifications, additions, and deletions can be made therein without departing from the spirit and scope of the invention as set forth in the following claims.

What is claimed is:

1. An environmental control unit (ECU), comprising, as a unitary packaged unit:
   means adapted to receive air conducted via ductwork to the control unit from an enclosed space;
   a blower adapted for inducing intake of a stream of external air into the control unit;
   means for combining the intake air and air received from the enclosed space to provide an air stream;
   a filter apparatus adapted to remove at least one chemical, biological, and/or radiological (CBR) agent from the air stream, and the filter apparatus being contained within a cabinet;
   temperature adjustment means, also contained within the cabinet, adapted to manipulate the temperature of the air stream before or after the air stream passes through the filter apparatus;
   means adapted for outputting the filtered, temperature-manipulated air stream out of the unitary packaged unit for conduction of the filtered, temperature-manipulated air stream back to the enclosed space.

2. The environmental control unit of claim 1, wherein the means adapted for outputting the filtered, temperature-manipulated air stream for conduction of the filtered, temperature-manipulated air stream back to the enclosed space with creation of a positive air pressure in the enclosed space.

3. The environmental control unit of claim 1, further comprising a HEPA filter adapted to filter particulates from the air stream before the filtration of the air stream by the CBR agent filter.

4. The environmental control unit of claim 1, wherein the CBR agent filter comprising:
   a filter housing having an inlet opening and an outlet opening to permit air flow in through the inlet opening, through the housing and out through the outlet opening:
   at least one filter positioned within the filter housing such that air flows through the at least one filter; and wherein the at least one filter is at least >99.99% efficient at filtering out DMMP introduced at an intake side of the filter at 500 mg/m$^3$ dimethylphosphonate (DMMP) for at least 20 minutes at 250 fpm face velocity.

5. The environmental control unit of claim 4, wherein the filter includes at least one fibrous layer and activated carbon.

6. The environmental control unit of claim 4, wherein the filter includes at least one fibrous layer and ASZM-TEDA carbon in retentive contact with the fibrous layer.

7. The environmental control unit of claim 4, wherein the carbon comprises small mesh size highly activated carbon.

8. The environmental control unit of claim 4, wherein the CBR agent filter obtains at least approximately the same filtration efficacy yet with a lower pressure drop than that of packed bed carbon filters of comparable dimensions under similar filtering conditions.

9. The environmental control unit of claim 1, wherein temperature adjustment means comprises at least one of a heating means and a cooling means.

10. An air handling system, comprising:
    an enclosure comprising partitions defining an airspace to be protected from contamination by CBR agents;
    a first ductwork system fluidly connecting an intake air vent of the enclosure airspace to an exhaust manifold of an environmental control unit (ECU);
    a second ductwork system fluidly connecting an exhaust air vent of the enclosure airspace to an intake manifold of the ECU; and
    the ECU including, as a unitary packaged unit:
        means adapted to receive air conducted via the second ductwork system back to the ECU from the enclosure airspace;
        a blower adapted for inducing intake of a stream of external air into the ECU;
        means for combining the intake air and air received from the enclosed space to provide an air stream;
        a filter apparatus adapted to remove at least one CBR agent from the air stream, and the filter apparatus being contained within a cabinet;
        temperature adjustment means, also contained within the cabinet, adapted to manipulate the temperature of the air stream before or after the air stream passes through the filter apparatus;
        means adapted for outputting the filtered, temperature-manipulated air stream out of the unitary packaged unit for conduction of the filtered, temperature-manipulated air stream back to the enclosure air space via the first ductwork system.

11. The air handling system as claimed in claim 10, wherein the ECU being installed outside the enclosure and outside a building structure containing the enclosure, and the system adapted to draw external intake air comprising air drawn from outside the building structure.

12. An air handling system for protecting an enclosure inside a building, comprising:
    an enclosure comprising partitions defining an airspace to be protected from contamination by CBR agents;
    an environmental control unit (ECU) located inside the enclosure, and the system adapted to draw external intake air comprising air drawn from inside the building structure but outside the enclosure into the ECU, and the ECU including, as a unitary packaged unit:
    means adapted to receive air conducted from inside the building structure but outside the enclosure;
    an air intake blower adapted for inducing intake of a stream of the air conducted from inside the building structure but outside the enclosure into the ECU to provide an air stream;
    a filter apparatus adapted to remove at least one CBR agent from the air stream, wherein the filter apparatus being selected to be at least >99.99% efficient at filtering out DMMP introduced at an intake side of the filter at 500 m$^3$ dimethylphosphonate (DMMP) for at least 20 minutes at 250 fpm approach velocity;
    means adapted for outputting the filtered air stream for conduction of the filtered air stream back into the enclosure air space.

13. The air handling system of claim 12, wherein the ECU further comprises a means for combining the intake air with air received from the enclosed space to provide the air stream to be filtered.

14. A method for protecting an enclosure against an airborne CBR threat, comprising:
   a) providing an environmental control unit (ECU) as a unitary packaged unit, comprising:
      means adapted to receive air conducted via ductwork to the control unit from an enclosed space;
      a blower adapted for inducing intake of a stream of external air into the control unit;
      means for combining the intake air and received air to provide an air stream;
      a filter apparatus adapted to remove at least one CBR agent from the air stream, and the filter apparatus being contained within a cabinet;
      temperature adjustment means, also contained with the cabinet, adapted to manipulate the temperature of the air stream before or after the air stream passes through the filter apparatus;
      means adapted for outputting the filtered, temperature-manipulated air stream for conduction of the filtered, temperature-manipulated air stream;
   b) operating the blower effective to draw the air stream into the receiving means, through the filter apparatus and the temperature adjustment means;
   c) outputting the filtered, temperature-manipulated air stream from the outputting means;
   d) conducting the outputted filtered, temperature-manipulated air stream of the ECU to the airspace within the enclosure via the first system of air ducts;
   e) conducting air from within the enclosure to the air receiving means of the ECU via the second system of air ducts; and
   f) operating the blower before, after or during any of b), c), d), or e).

15. The method as claimed in claim 14, further comprising outputting the filtered, temperature-manipulated air stream for conduction of the filtered, temperature-manipulated air stream back to the enclosed space at a rate effective for creation of a positive air pressure in the enclosed space.

16. The method as claimed in claim 14, further comprising outputting the filtered, temperature-manipulated air stream for conduction of the filtered, temperature-manipulated air stream back to the enclosed space at a rate effective for creation of a negative air pressure in the enclosed space.

17. The method as claimed in claim 14, wherein the filter apparatus being selected to be at least >99.99% efficient at filtering out DMMP introduced at an intake side of the filter at 500 mg/m$^3$ dimethylphosphonate (DMMP) for at least 20 minutes at 250 fpm face velocity.

18. The method as claimed in claim 14, wherein the ECU being installed outside the enclosed space and outside a building structure containing the enclosed space, wherein the external intake air comprising air drawn from outside the building structure.

19. A method for protecting an enclosure inside a building against an airborne CBR threat, comprising:
   a) locating an environmental control unit (ECU) within a building including an enclosure defining an enclosure air space, the ECU comprising, as a unitary packaged unit:
      means adapted to receive air conducted from inside the building structure but outside the enclosure;
      a blower adapted for inducing intake of a stream of the air conducted from inside the building structure but outside the enclosure into the ECU to provide an air stream;
      a filter apparatus adapted to remove at least one CBR agent from the air stream;
      means adapted for outputting the filtered air stream for conduction of the filtered air stream into the enclosure air space;
   b) operating the blower effective to draw the air stream into the receiving means, through the filter apparatus, and then expelling the filtered air stream from the outputting means into the enclosure air space; and
   c) providing the enclosure air space HVAC support by a separate HVAC system supporting the enclosure air space and other airspace within the same building under normal absence of CBR threat conditions, wherein external intake air to the enclosed space being drawn from inside the building structure via the ECU instead of the HVAC system when under CBR threat conditions.

20. The method of claim 19, wherein the ECU being installed outside the enclosure air space.

21. The method of claim 14, wherein the CBR agent comprises a chemical agent selected from the group consisting of a nerve agent, a blister agent, a blood agent, and a choking agent.

22. The method of claim 14, wherein the CBR agent comprises a biological agent selected from the group consisting of a bacterial agent and a viral agent.

23. The method of claim 14, wherein the CBR agent comprises a radiological agent selected from the group consisting of an alpha radiation source, a beta radiation source, and a gamma radiation source.

24. An environmental control unit (ECU), comprising, as a unitary packaged unit:
   means adapted to receive air conducted via ductwork to the control unit from an enclosed space;
   a blower adapted for inducing intake of a stream of external air into the control unit;
   means for combining the intake air and air received from the enclosed space to provide an air stream;
   a HEPA filter adapted to filter particulates from the air stream;
   a filter apparatus adapted to remove at least one chemical, biological, and/or radiological (CBR) agent from the air stream after filtration of the air stream by the HEPA filter;
   temperature adjustment means adapted to manipulate the temperature of the air stream before or after the air stream passes through the filter apparatus;
   means adapted for outputting the filtered, temperature-manipulated air stream for conduction of the filtered, temperature-manipulated air stream back to the enclosed space.

25. An environmental control unit (ECU), comprising, as a unitary packaged unit:
   means adapted to receive air conducted via ductwork to the control unit from an enclosed space;
   a blower adapted for inducing intake of a stream of external air into the control unit;
   means for combining the intake air and air received from the enclosed space to provide an air stream;
   a filter apparatus adapted to remove at least one chemical, biological, and/or radiological (CBR) agent from the entire air stream;

temperature adjustment means adapted to manipulate the temperature of the air stream before or after the air stream passes through the filter apparatus;

means adapted for outputting the filtered, temperature-manipulated air stream for conduction of the filtered, temperature-manipulated air stream back to the enclosed space, wherein the blower further being operable effective to continuously induce intake of the air stream continuously through the filter apparatus while effecting discharge of the filtered, temperature-adjusted air stream from the outputting means back to the enclosed space, and while the means adapted to receive air receives recirculated air conducted via ductwork to the control unit from the enclosed space.

26. An environmental control unit (ECU), comprising, as a unitary packaged unit:

means adapted to receive air conducted via ductwork to the control unit from an enclosed space;

a blower adapted for inducing intake of a stream of external air into the control unit;

means for combining the intake air and air received from the enclosed space to provide an air stream;

temperature adjustment means adapted to manipulate the temperature of the air stream;

a filter apparatus adapted to remove at least one chemical, biological, and/or radiological (CBR) agent from the entire air stream, wherein the blower is operable to pass the air stream through the filter apparatus after the air stream is conducted to the temperature adjustment means;

means adapted for outputting the filtered, temperature-manipulated air stream out of the unitary packaged unit for conduction of the filtered, temperature-manipulated air stream back to the enclosed space, wherein the blower further being operable effective to continuously induce intake of the air stream continuously through the filter apparatus while effecting discharge of the filtered, temperature-adjusted air stream from the outputting means back to the enclosed space, and while the means adapted to receive air receives recirculated air conducted via ductwork to the control unit from the enclosed space.

* * * * *

UNITED STATES PATENT AND TRADEMARK OFFICE
CERTIFICATE OF CORRECTION

PATENT NO. : 6,796,896 B2
DATED : September 28, 2004
INVENTOR(S) : Peter J. Laiti It is certified that error appears in the above-identified patent and that said Letters Patent is hereby corrected as shown below:

Column 18,
Line 63, "$m^3$" should read -- $mg/m^3$ --.

Signed and Sealed this

Tenth Day of May, 2005

JON W. DUDAS
*Director of the United States Patent and Trademark Office*